United States Patent Office 2,951,871
Patented Sept. 6, 1960

2,951,871
POLYFLUOROALKYL BORATES

Hansjuergen A. Schroeder, Columbus, Ohio, assignor to Olin Mathieson Chemical Corporation, a corporation of Virginia No Drawing. Filed July 21, 1959, Ser. No. 828,466

3 Claims. (Cl. 260—606.5)

This invention relates to novel polyfluoroalkyl borates and to a method for their preparation. In particular, it relates to polyfluoroalkyl borates of the general formula:

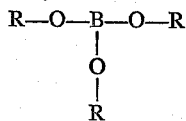

wherein R is the radical $CF_3(CF_2)nCH_2-$ and $n$ is an integer from 0 to 5.

In general, the novel polyfluoroalkyl borates of this invention are prepared by reacting boron trichloride with a fluorinated alkyl monohydric alcohol of the formula $CF_3(CF_2)nCH_2OH$, wherein $n$ is an integer from 0 to 5, at a temperature from about $-15°$ C. to about $+50°$ C. and in the presence of an inert solvent. After filtering off any solids formed during the reaction, the inert solvent is removed by evaporation and the product separated from the unreacted fluorinated alcohol by distillation. Suitable fluorinated alcohols include, for example, 1,1-H,H-trifluoroethanol, 1,1-H,H-pentafluoropropanol, 1,1-H,H-heptafluorobutanol, and 1,1-H,H-nonafluoropentanol. Useful inert solvents include petroleum ether, benzene, toluene, xylene, etc.

Fluorinated alkyl monohydric alcohols can be produced according to the method of K. N. Campbell et al., JACS, 72, 4380 (1950). For example, 1,1-H,H-trifluoroethanol can be made by reacting butyltrifluoroacetate with lithium aluminum hydride in dry ether. By reacting trifluoroacetic acid with butanol in the presence of concentrated sulfuric acid, butyltrifluoroacetate can be prepared according to the procedure set forth by H. Gilman et al., JACS, 65, 1458 (1943).

The novel compounds of this invention are useful as intermediates in the preparation of boronic and borinic acids, as water acceptors, and as ingredients in soldering or brazing fluxes. They also find use as compounding ingredients for natural and synthetic resins where they are especially valuable, since in addition to serving as plasticizers, they reduce the inflammability of the material being plasticized. These borates can also be used in the drying of solvents where it is desired to remove the last traces of moisture since on hydrolysis they form the high boiling fluorinated alcohol and boric acid from which the material being dried can be easily recovered by distillation. Benzene and other solvents suitable for Friedel-Crafts alkylation reactions may be dried in this manner.

The ratio of fluorinated alcohol to boron trichloride charged can be varied widely from about 3 to 10 moles of alcohol per mole of boron trichloride with the preferred range being from 3 to 5 moles of alcohol per mole of boron trichloride. The reaction time generally will be from about one-half to three hours.

This invention is further illustrated by the following specific examples.

Example I

A solution of 23 g. of boron trichloride in 200 ml. of petroleum ether was added dropwise to a stirred mixture of 100 g. of 1,1-H,H-heptafluorobutanol and 100 ml. of petroleum ether with ice-salt cooling during a 40 minute period. To ensure complete reaction, the mixture was kept for 20 minutes at $+20°$ C. In the next step, the mixture was filtered to remove solids formed during the reaction, and the petroleum ether evaporated from the mother liquor obtained. The crude product was then distilled under reduced pressure and after a forerun of unreacted heptafluorobutanol, 66.5 g. of tris-1,1-H,H-heptafluorobutyl borate was obtained, which had a B.P. 137° C./200 mm. Hg; $n_D^{23}$ 1.2965.

The compound $C_{12}H_6BF_{21}O_3$ was analyzed for carbon, hydrogen and fluorine and the following results were obtained.

Calcd. for $C_{12}H_6BF_{21}O_3$: C, 23.7; H, 0.99; F, 65.63. Found: C, 24.29, 24.48; H, 1.18, 1.19; F, 64.50, 64.33.

Example II

This experiment was carried out in the same manner as that described in Example I. In this example, 17 g. of boron trichloride and 150 ml. of petroleum ether were added dropwise to a stirred mixture of 58 g. of 1,1-H,H-pentafluoropropanol suspended in 60 ml. of petroleum ether with ice-salt cooling during a 40 minute period. The reaction mixture was then maintained at $+20°$ C. for 20 minutes to ensure complete reaction. After filtering off the solids formed, the petroleum ether was evaporated from the mother liquor obtained. From the crude product there was recovered by distillation 39 g. of the desired tris-1,1-H,H-pentafluoropropyl borate which had a B.P. 110° C./200 mm. Hg; $n_D^{23}$ 1.2940. This represents a 66 percent yield of the theoretical quantity. The compound $C_9H_6BF_{15}O_3$ was analyzed for carbon, hydrogen, boron and fluorine and the following results were obtained.

Calcd. for $C_9H_6BF_{15}O_3$: C, 23.60; H, 1.32; B, 2.36; F, 62.63. Found: C, 23.63, 23.89; H, 1.98; B, 2.06; F, 63.53, 63.89.

Example III

This example was carried out in the same manner as this described in Example I. A solution of 25 g. of boron trichloride in 170 ml. of petroleum ether was added dropwise to a stirred mixture of 60 g. of 1,1-H,H-trifluoroethanol and 60 ml. of petroleum ether with ice-salt cooling during a 40 minute period. After removal of solids by filtration, evaporation of ether and distillation of the reaction mixture in the manner described previously, there was obtained 37 g. of tris-1,1-H,H-trifluoroethyl borate (60 percent of the theoretical quantity) with a B.P. 77° C./200 mm. of Hg; $n_D^{23}$ 1.2975. The compound $C_6H_6BF_9O_3$ was analyzed for carbon and hydrogen and the following results were obtained.

Calcd. for $C_6H_6BF_9O_3$: C, 23.40; H, 1.96. Found: C, 23.32, 23.19; H, 2.34, 2.55.

What is claimed is:

1. Polyfluoroalkyl borates of the formula:

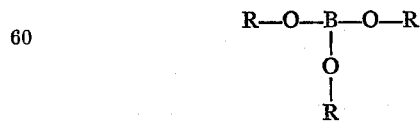

wherein R is the radical $CF_3(CF_2)nCH_2-$ and $n$ is an integer from 1 to 5.
2. Tris-1,1-H,H-pentafluoropropyl borate.
3. Tris-1,1-H,H-heptafluorobutyl borate.

References Cited in the file of this patent

Lappert: Chem. Reviews, vol. 56, pages 964 and 969 (1956).